(12) United States Patent
Kim et al.

(10) Patent No.: US 12,461,144 B2
(45) Date of Patent: Nov. 4, 2025

(54) RUBBER SOCKET WITH BUILT-IN COMPONENT

(71) Applicant: TSE CO., LTD, Cheonan-si (KR)

(72) Inventors: Seon A Kim, Cheonan-si (KR); Yun Chan Nam, Cheonan-si (KR)

(73) Assignee: TSE CO., LTD., Chungcheongnam-Do (KR)

( * ) Notice: Subject to any disclaimer, the term of this patent is extended or adjusted under 35 U.S.C. 154(b) by 203 days.

(21) Appl. No.: 18/485,863

(22) Filed: Oct. 12, 2023

(65) Prior Publication Data

US 2024/0125845 A1 Apr. 18, 2024

(30) Foreign Application Priority Data

Oct. 17, 2022 (KR) .................. 10-2022-0132927

(51) Int. Cl.
*G01R 31/28* (2006.01)
*G01R 1/04* (2006.01)
*H01R 13/24* (2006.01)
*H01R 13/66* (2006.01)

(52) U.S. Cl.
CPC ....... *G01R 31/2879* (2013.01); *G01R 1/0416* (2013.01); *G01R 1/0466* (2013.01); *H01R 13/2414* (2013.01); *H01R 13/6683* (2013.01)

(58) Field of Classification Search
CPC ................ G01R 1/0408; G01R 1/0416; G01R 1/0466; G01R 31/2879; G01R 31/2601; G01R 31/2863; G01R 31/2893; H01R 13/2414; H01R 13/6683; H01R 2201/20; H01R 13/66; H01R 13/02; H01R 13/40
See application file for complete search history.

(56) References Cited

U.S. PATENT DOCUMENTS

| | | | |
|---|---|---|---|
| 9,423,419 B2 * | 8/2016 | Lee | ............ G01R 1/0408 |
| 9,696,344 B2 | 7/2017 | Lee | |
| 11,131,707 B1 * | 9/2021 | Oh | ............ G01R 31/2863 |
| 11,506,705 B2 * | 11/2022 | Oh | ............ G01R 1/0466 |
| 2015/0084658 A1 | 3/2015 | Lee | |

FOREIGN PATENT DOCUMENTS

KR 10-1284212 B1 7/2013

* cited by examiner

*Primary Examiner* — Vinh P Nguyen
(74) *Attorney, Agent, or Firm* — Crowell & Moring LLP; John C. Freeman

(57) ABSTRACT

Provided is a rubber socket having a structure with a built-in component. In the rubber socket with a built-in component, a connection sheet having components attached to an upper surface, a lower surface, or upper and lower surfaces of a conductive sheet composed of a conductive part and an insulating part is detachably coupled to the upper surface, the lower surface, or the upper and lower surfaces, and a guide sheet made of an inelastic insulating material is attached to an upper side, a lower side, or upper and lower sides of the connection sheet, and characteristics of a tester or a device to be tested may be tested using the components.

8 Claims, 7 Drawing Sheets

RUBBER SOCKET WITH BUILT-IN COMPONENT

CROSS-REFERENCE TO RELATED APPLICATION(S)

This application is based on and claims priority under 35 U.S.C. 119 to Korean Patent Application No. 10-2022-0132927, filed on Oct. 17, 2022, in the Korean Intellectual Property Office, the disclosures of which are herein incorporated by reference in their entireties.

BACKGROUND OF THE INVENTION

Technical Field

The disclosure relates to a rubber socket used for transmitting an electrical signal by connecting to a device to be tested such as a semiconductor package, and more particularly, to a rubber socket with a built-in component.

Background Art

Semiconductor device testing is conducted to determine whether a produced semiconductor device is defective. In a test process, a predetermined test signal from a test device is sent to the semiconductor device to determine whether the semiconductor device is short-circuited. Such a test device and semiconductor device are not directly connected to each other, but indirectly connected through a test socket.

Representative test sockets include a pogo socket and a rubber socket. The pogo socket is constituted by a method of assembling individually produced pogo pins into a housing, and short circuits and leakages between pogo pins are rare, except for special cases. However, due to package ball damage, which is a problem in pogo sockets, and rising unit prices, the demand for rubber sockets is increasing rather than that of pogo sockets in the semiconductor test process.

The rubber socket has a structure in which a conductive part including a large number of conductive particles is disposed inside an elastic material such as silicon so as to be insulated from each other inside an insulating part made of an elastic material such as silicon. Such a rubber socket has the characteristic of being conductive only in a thickness direction, and does not use mechanical means such as soldering or springs; thus, the rubber socket is excellent in durability and has the advantage of being able to achieve simple electrical connections. Further, because the rubber socket may absorb mechanical shock or deformation, the rubber socket has the advantage of enabling smooth connection to semiconductor devices, and the like.

FIGS. 1A-1B schematically illustrate a conventional rubber socket used in a test process of a semiconductor device.

A rubber socket 30 illustrated in FIGS. 1A-1B includes a plurality of conductive parts 32 that are in contact with a terminal 13 of a device to be tested 10 and an insulating part 31 that supports the plurality of conductive parts 32 to be spaced apart from each other. The insulating part 31 is made of an elastic insulating material, and the conductive part 32 is made of a plurality of conductive particles included in the elastic insulating material. An upper insulating sheet 33 may be attached to an upper surface of the insulating part 31, and a lower insulating sheet 34 may be attached to a lower surface of the insulating part 31.

The conventional rubber socket 30 is mounted on a tester 20, and when the device to be tested 10 is pressed toward the rubber socket 30 by a pressing means (not illustrated), the terminal 13 of the device to be tested 10 is pressed to the upper end of the conductive part 32, and the lower end of the conductive part 32 is pressed to a pad 23 of the tester 20. In this case, a test signal generated in the tester 20 is transmitted to the device to be tested 10 through the rubber socket 30; thus, an electrical test on the device to be tested 10 may be performed.

However, the conventional rubber socket does not have a structure with a built-in component. Therefore, in order to measure characteristics of the semiconductor device itself, such as measuring a speed of transmission from one terminal of the semiconductor device to another terminal, a test should be performed by mounting components on the semiconductor device, and even in the case that a test device performs a loop-back test, which sends a signal from the test device and returns the signal to the origin after passing through a certain section of a line in order find whether the test device operates appropriately, the test had to be performed by mounting components in the test device.

In this way, in the case that components are mounted on the semiconductor device or test device itself, an area of the semiconductor device or test device increases, and the component is formed to protrude; thus, an interface substrate should be installed between the component and the rubber socket in order to avoid interference between the component and the rubber socket and therefore, because a signal path increases, there is a problem that electrical signal transmission characteristics are deteriorated.

RELATED ART (Patent Document 1) Korean Registered Patent Publication No. 10-1284212 (Jul. 9, 2013)

SUMMARY

The disclosure was conceived in consideration of the above-described points, and provides a rubber socket having a structure with a built-in component.

According to the disclosure to solve the above-described object, a rubber socket with a built-in component for connecting a device to be tested to a tester for generating a test signal to perform an electrical test on the device to be tested, wherein the tester may include a tester pad including electrode pads each electrically connected to a plurality of terminals of the device to be tested, and a pair of communication pads at adjacent positions, wherein the rubber socket may include a conductive sheet including a conductive part formed in a form in which a plurality of conductive particles are included in an elastic insulating material and including an electrode conductive part disposed at a position corresponding to the electrode pad and a pair of communication conductive parts disposed at a position corresponding to the communication pad, and an insulating part configured to insulate adjacent conductive parts while supporting the conductive part; a connection sheet made of an insulating material detachably coupled to an upper surface side of the conductive sheet, and having connection holes formed at each position corresponding to the conductive part, and in which a connection conductive part is disposed in the connection hole corresponding to the electrode conductive part, and in which a pair of connectors are disposed in the connection hole corresponding to the communication conductive part; a component disposed at an upper surface of the pair of connectors of the connection sheet; and a guide sheet made of an insulating material attached to an upper surface side of the connection sheet and having guide holes formed at each position corresponding to the connection conductive part and the component, wherein characteristics of the tester may be tested through the component.

The component may be a resistor, an inductor, a capacitor, or an electromagnetic device in which the resistor, the inductor, and the capacitor are coupled.

The connection sheet may further include a bridge hole extended from the connection hole corresponding to the communication conductive part, and the connector may be formed in any one of a form that fills both the connection hole and the bridge hole, a form that fills a portion of the connection hole and the bridge hole, or a form that fills only the bridge hole.

A thickness of the guide sheet may be greater than that of the component.

The connection sheet and the guide sheet may be made of any one of polyimide film, engineering plastic, or synthetic resin which are inelastic insulating materials.

The conductive part may further include a conductive part lower bump protruding downward from the insulating part.

A lower insulating sheet configured to support the conductive part lower bump may be attached to a lower surface of the insulating part.

Further, according to the disclosure, a rubber socket with a built-in component for connecting a device to be tested to a tester for generating a test signal to perform an electrical test on the device to be tested, wherein the device to be tested may include terminals of the device to be tested including electrode terminals each electrically connected to a plurality of pads of the tester, and a pair of communication terminals at adjacent positions, wherein the rubber socket may include a conductive sheet including a conductive part formed in a form in which a plurality of conductive particles are included in an elastic insulating material and including an electrode conductive part disposed at a position corresponding to the electrode terminal and a pair of communication conductive parts disposed at a position corresponding to the communication terminal, and an insulating part configured to insulate adjacent conductive parts while supporting the conductive part; a connection sheet made of an insulating material detachably coupled to a lower surface side of the conductive sheet and having connection holes formed at each position corresponding to the conductive part and in which a connection conductive part is disposed in the connection hole corresponding to the electrode conductive part, and in which a pair of connectors are disposed in the connection hole corresponding to the communication conductive part; a component disposed at a lower surface of the pair of connectors of the connection sheet; a guide sheet made of an insulating material attached to a lower surface of the connection sheet and having guide holes formed at each position corresponding to the connection conductive part and the component; and a conductive part lower bump formed in the guide hole at a position corresponding to the connection conductive part of the guide sheet, wherein characteristics of the device to be tested may be tested through the component.

BRIEF DESCRIPTION OF THE DRAWINGS

In the drawings, the same or similar reference numerals may be used for the same or similar components.

FIG. 8 illustrates a rubber socket according to another embodiment of the disclosure.

DETAILED DESCRIPTION

Hereinafter, a rubber socket with a built-in component according to the disclosure will be described in detail with reference to the drawings.

In the disclosure, because a device to be tested is located at the upper side of a rubber socket, and a tester is located at the lower side thereof, an 'upper surface', 'upper side', 'upper end', 'lower surface', 'lower side', and 'lower end' of any component will be described based on this.

Figure 1A:
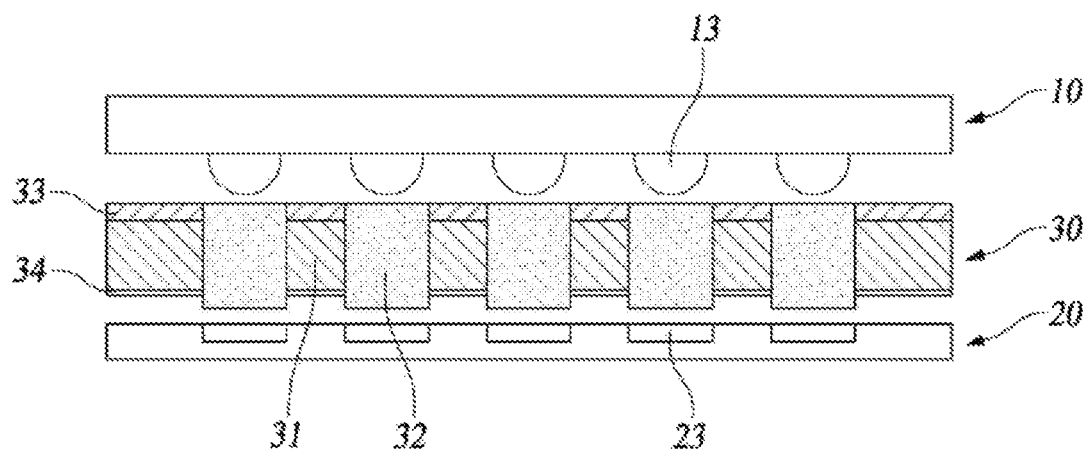
FIGS. 1A-1B illustrate an operation of a conventional rubber socket.
Figure 1B:
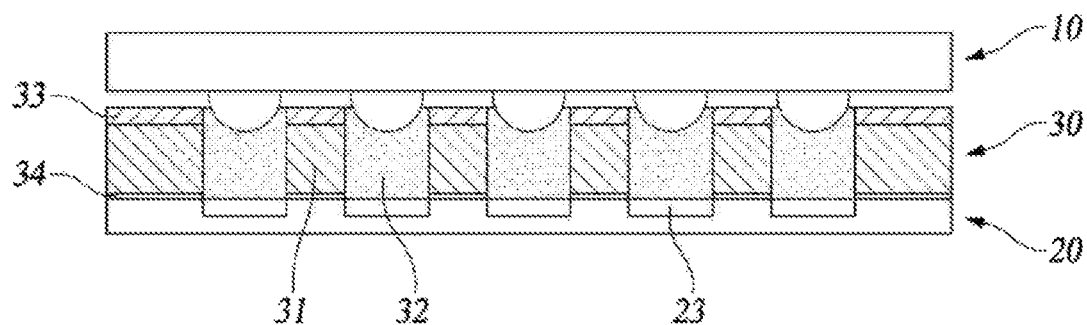
Figure 2A:
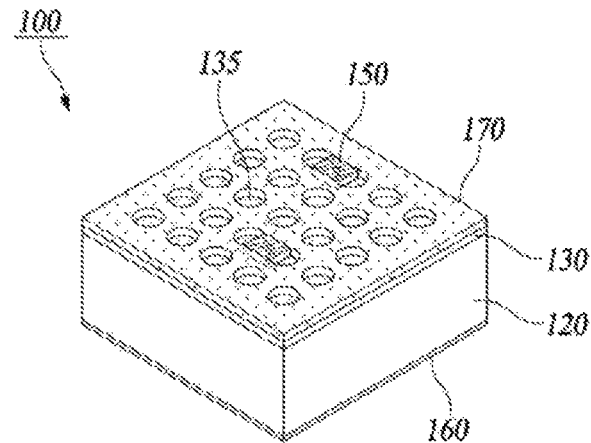
FIGS. 2A-2B illustrate a rubber socket with a component mounted on the upper side according to an embodiment of the disclosure.
Figure 2B:
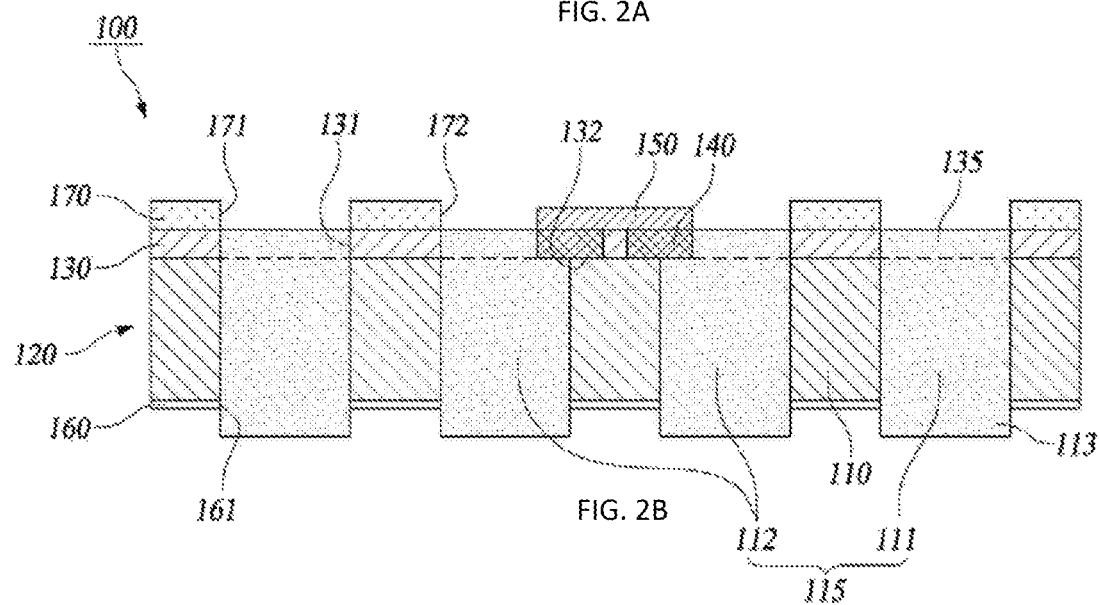
Figure 3A:
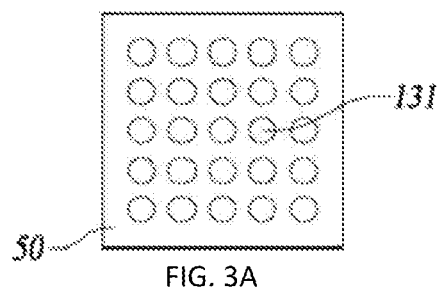
FIGS. 3A-3G illustrate a process of coupling a component and a guide sheet to a connection sheet according to an embodiment of the disclosure.
Figure 3B:
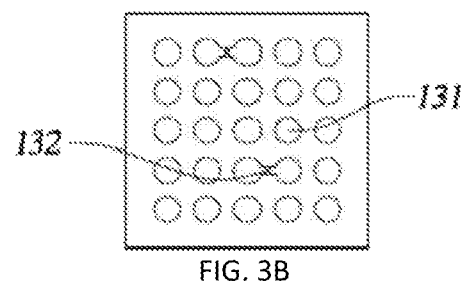
Figure 3C:
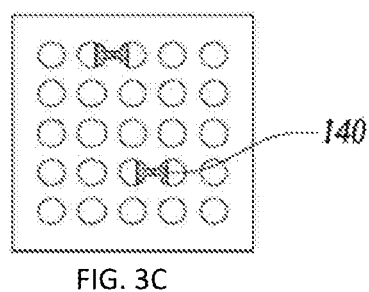
Figure 3D:
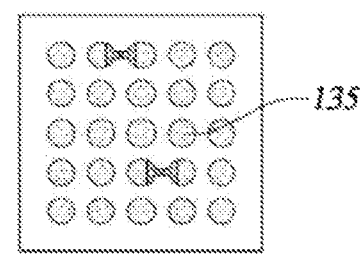
Figure 3E:
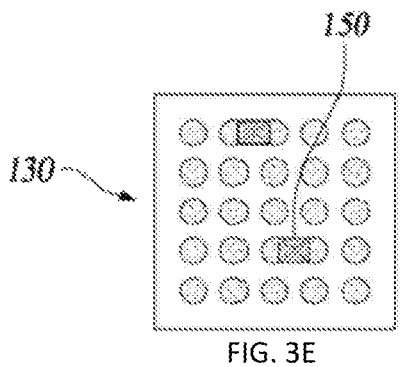
Figure 3F:
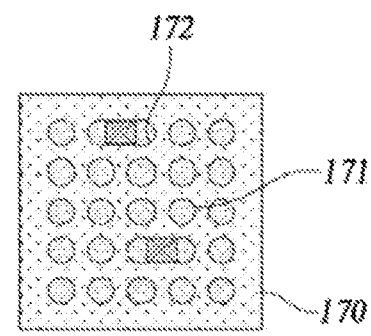
Figure 3G:
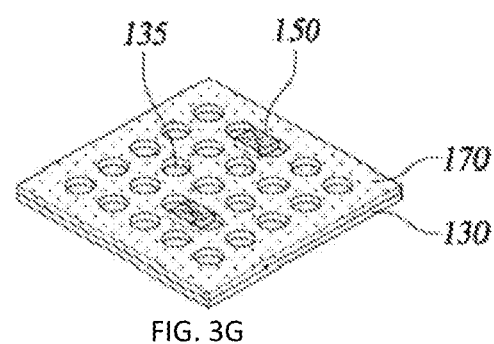
Figure 4A:
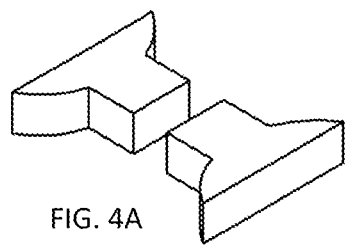
FIGS. 4A-4D illustrate various modifications of a connector according to an embodiment of the disclosure.
Figure 4B:
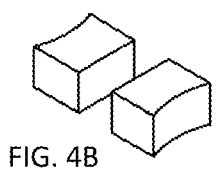
Figure 4C:
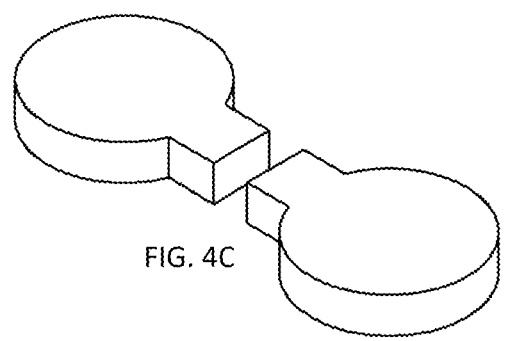
Figure 4D:
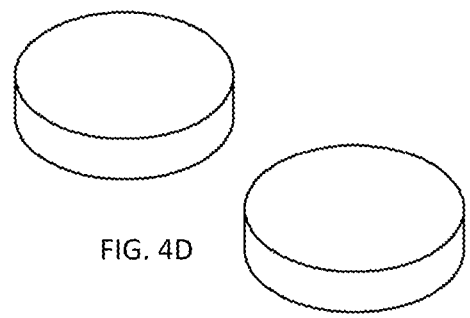
Figure 5A:
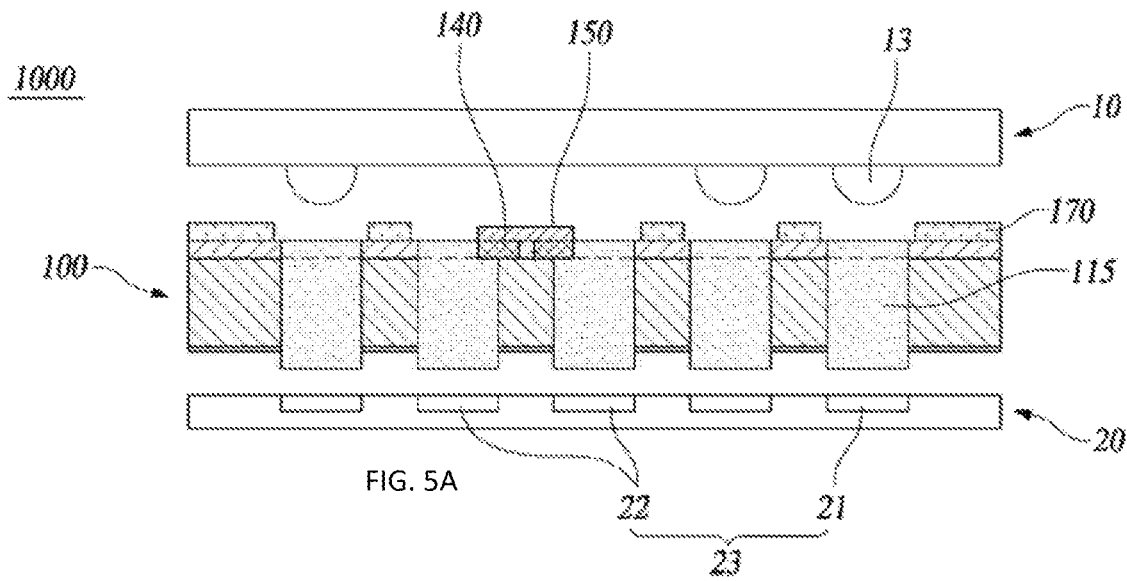
FIGS. 5A-5B illustrate an operation of a rubber socket according to an embodiment of the disclosure.
Figure 5B:
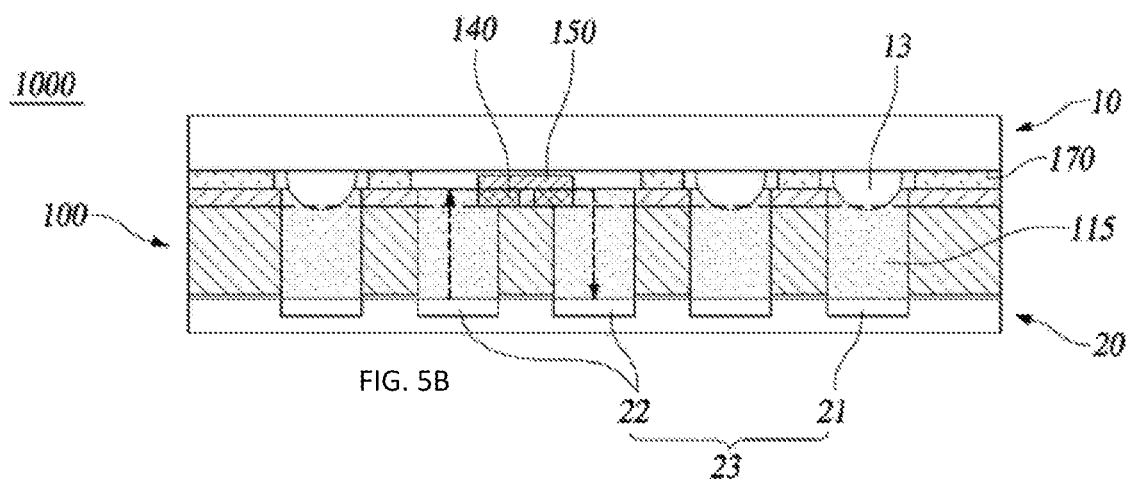

FIGS. 2A-2B illustrate a rubber socket with a component mounted at the upper side according to an embodiment of the disclosure, FIGS. 3A-3G illustrate a process of coupling a component and a guide sheet to a connection sheet according to an embodiment of the disclosure, FIGS. 4A-4D illustrate various modifications of a connector according to an embodiment of the disclosure, and FIGS. 5A-5B illustrate an operation of a rubber socket according to an embodiment of the disclosure.

As illustrated in the drawing, it is characterized in that a rubber socket 100 with a built-in component according to an embodiment of the disclosure connects a device to be tested 10 to a tester 20 for generating a test signal to perform an electrical test for the device to be tested 10, wherein the tester 20 includes a tester pad 23 including electrode pads 21 each electrically connected to a plurality of terminals 13 of the device to be tested 10, and a pair of communication pads 22 at adjacent positions, and the rubber socket 100 includes a conductive sheet 120 including a conductive part 115 including an electrode conductive part 111 formed in a form in which a plurality of conductive particles are included in an elastic insulating material and disposed at a position corresponding to the electrode pad 21 and a pair of communication conductive parts 112 disposed at positions corresponding to the communication pad 22 and an insulating part 110 for insulating adjacent conductive parts while supporting the conductive part; a connection sheet 130 made of an insulating material detachably coupled to an upper surface side of the conductive sheet 120 and in which connection holes 131 are formed at each position corresponding to the conductive part 115 and in which a connection conductive part 135 is disposed in the connection hole corresponding to the electrode conductive part 111 and in which a pair of connectors 140 are disposed in the connection hole corresponding to the communication conductive part 112; a component 150 disposed at an upper surface of the pair of connectors 140 of the connection sheet 130; and a guide sheet 170 made of an insulating material attached to an upper surface side of the connection sheet 130, and in which guide holes 171 and 172 are formed at each position corresponding to the connection conductive part 135 and the component 150, wherein characteristics of the tester 20 may be tested through the component 150.

The tester 20 includes electrode pads 21 each electrically connected to a plurality of terminals of the device to be tested, and a tester pad 23 including a pair of communication pads 22 at adjacent positions. That is, in the disclosure, a pair of communication pads 22 disposed at adjacent positions are additionally provided.

The conductive sheet 120 includes a conductive part 115 formed in a form including a plurality of conductive particles in an elastic insulating material and including an electrode conductive part 111 disposed at a position corresponding to the electrode pad 21 and a pair of communication conductive parts 112 disposed at a position corresponding to the communication pad 22, and an insulating part 110 for insulating adjacent conductive parts while supporting the conductive part 115.

The conductive part 115 may be formed in a form in which a plurality of conductive particles are aligned in a thickness direction of the insulating part 110 in the elastic insulating material so that it may be electrically connected to the terminal 13 of the device to be tested 10 or may be connected to the component 150 electrically connected to the connector 140 to be described later. A plurality of conductive parts 115 are spaced apart from each other inside the insulating part 110 to correspond to the tester pad 23 to be connected. The conductive part 115 includes an electrode conductive part 111 connecting to the electrode pad 21 and the terminal 13 of the device to be tested, and a communication conductive part 112 connecting to the connector 140 and the communication pad 22.

An elastic insulating material constituting the conductive part 115 may use a heat-resistant polymer material, for example, silicone rubber with a cross-linked structure. Further, conductive particles constituting the conductive part 115 are those that have magnetism so that they may react with a magnetic field and may use, for example, particles of metals representing magnetism such as iron, nickel, and cobalt, or particles of alloys thereof, particles containing these metals or these particles as core particles and metals with good conductivity such as gold, silver, palladium, and radium plated on a surface of the core particles.

The conductive part 115 may include a conductive part lower bump 113 that protrudes downward from the insulating part 110. The conductive part 115 of such a structure may smoothly provide a stroke necessary for connecting the terminal 13 of the device to be tested 10 to the tester 20. Further, the conductive part 115 including the conductive part lower bump 113 distributes a load when the terminal 13 of the device to be tested 10 contacts, thereby being advantageous in preventing the device to be tested 10 from being damaged.

A lower insulating sheet 160 supporting the conductive part lower bump 113 may be attached to the lower surface of the insulating part 110 in which the conductive part lower bump 113 is provided. The lower insulating sheet 160 supports the conductive part lower bump 113 and serves to prevent short-circuits between the conductive part lower bumps 113. The lower insulating sheet 160 is preferably attached so that the conductive part lower bump 113 protrudes downward from the lower insulating sheet 160.

The insulating part 110 supports the plurality of conductive parts 115 to be spaced apart from each other while enclosing each side of the plurality of conductive parts 115. The insulating part 110 may be made of an elastic insulating material. The elastic insulating material constituting the insulating part 110 may be made of the same material as the elastic insulating material constituting the conductive part 115.

The connection sheet 130 is detachably coupled to an upper surface side of the conductive sheet 120. The connection sheet 130 is made of an insulating material, and connection holes 131 are formed at each position corresponding to the conductive part 115.

Among the plurality of connection holes 131 of the conductive sheet 120, the connection conductive part 135 is disposed in the connection hole 131 formed at a position corresponding to the electrode conductive part 111. The connection conductive part 135 is formed by filling and then solidifying the connection hole 131 with a conductive particle mixture including a plurality of conductive particles in an elastic insulating material. The elastic insulating material and conductive particles constituting the connection conductive part 135 may use the same materials or conductive particles as the elastic insulating material and conductive particles constituting the conductive part 115, and in order to improve electrical conductivity, it is possible to form a higher density of conductive particles than that of the conductive part 115.

The connector 140 may be disposed in the connection hole 131 formed at a position corresponding to the communication conductive part 112 among the plurality of connection holes 131. In order to expand an area connected to the component 150 by additionally securing a space in which the connector 140 is to be disposed in the connection sheet 130, it is preferable that the connector 140 is disposed even in the bridge holes 132 by forming bridge holes 132 extending toward each other in a pair of connection holes 131 formed at positions corresponding to the communication conductive part 112.

The connector 140 is formed in various shapes in consideration of a size of the component 150, electrical connectivity with the component 150, and the like. FIGS. 4A-4D illustrate some of various modifications of the connector.

As illustrated in FIG. 4A, the connector 140 may be formed in a form of filling a portion of the connection hole 131 and the bridge hole 132. It should be noted that the disclosure is described as an example in which the connector 140 is formed in a form of filling a portion of the connection hole 131 and the bridge hole 132.

Further, as illustrated in FIG. 4B, the connector 140 may be formed in a form of filling only the bridge hole 132 without filling the connection hole 131. Such a structure may be useful in the case that a size of the component 150 disposed on the connector 140 is small. As illustrated in FIGS. 4A and 4B, in the case that the connector 140 does not completely fill the connection hole 131, it is preferable that a portion of the connection hole 131 that is not filled with the connector 140 is filled with the same material as that of the connection conductive part 135.

Further, as illustrated in FIG. 4C, the connector 140 may be formed in a form of filling both the connection hole 131 and the bridge hole 132. Such a structure may be useful in the case that the size of the component 150 disposed on the connector 140 is large.

Further, as illustrated in FIG. 4D, the connector 140 may be formed in a form of filling only the connection hole 131 without forming a separate bridge hole 132. Such a structure has the advantage of improving work productivity because a process of forming a separate bridge hole 132 may be omitted. However, the connector 140 illustrated in FIG. 4C has an additional process of forming the bridge hole 132 compared to the connector 140 illustrated in FIG. 4D, but because an area connected to the component 150 by a size corresponding to the bridge hole 132 increases, there is an advantage that electrical connectivity between the connector 140 and the component 150 is more improved.

Such a form of connector 140 may be formed by a method of depositing a metal material on the connection hole 131 and the bridge hole 132 through pattern processing, and it is possible to couple the connector 140 to the connection hole 131 and the bridge hole 132 by inserting the connector 140 of a metal material produced by an MEMS process into the connection hole 131 and the bridge hole 132. The connector 140 formed in this way has a thickness equal to the thickness of the connection sheet 130.

The connection sheet 130 may be detachably coupled to the upper surface of the conductive sheet 120. The conductive sheet 120 and the connection sheet 130 may be coupled by a method of attaching by an adhesive, be coupled by a bolt and nut fastening method, or be detachably coupled by various other methods.

Because the connection sheet 130 is detachably coupled to the conductive sheet 120, when either the conductive sheet 120 or the connection sheet 130 is damaged, only necessary parts may be easily replaced, thereby having the effect of reducing costs and improving working productivity.

The component 150 is mounted on the upper surface of the pair of connectors 140 disposed in the connection sheet 130. The component 150 may be a resistor, an inductor, a capacitor, or an electromagnetic device to which the resistor, the inductor, and the capacitor are coupled, and each of an input terminal and an output terminal of the component 150 may be electrically connected to the communication pad 22 through the communication conductive part 112 and the connector 140.

A guide sheet 170 is attached to an upper surface of the connection sheet 130, that is, a surface facing the device to be tested 10, and has a structure in which guide holes 171 and 172 are formed at each position corresponding to the connection conductive part 135 and the component 150 on a sheet made of an insulating material. The guide sheet 170 guides the terminal 13 of the device to be tested to the connection conductive part 135 to perform a function of aligning positions of the rubber socket 100 and the device to be tested 10 and protecting the component 150.

The terminal 13 of the device to be tested is connected to the conductive part 115 by contacting the connection conductive part 135 through the guide hole 171. However, because the terminal 13 is not formed in the device to be tested 10 at a position corresponding to the component 150, the component 150 is not affected by the terminal 13 of the device to be tested.

The thickness of the guide sheet 170 is formed to be equal to or greater than that of the component 150. However, it is more preferable that the thickness of the guide sheet 170 is greater than that of the component 150 so as not to be affected by the device to be tested 10.

If the guide sheet 170 has a greater thickness than that of the component 150, as illustrated in FIG. 5B, when the device to be tested 10 is pressed toward the rubber socket 100, the lower surface of the device to be tested (i.e., the surface in which the terminal is not formed) is lowered only until it touches the upper surface of the guide sheet 170; thus, the lower surface of the device to be tested does not contact the upper surface of the component 150. Accordingly, the component 150 may be prevented from being damaged by the device to be tested 10.

The connection sheet 130 and the guide sheet 170 may be made of an inelastic insulating material. The connection sheet 130 and the guide sheet 170 made of an inelastic insulating material are advantageous for pressing the device to be tested 10 toward the rubber socket 100 when coming into contact with the device to be tested 10. The connection sheet 130 and the guide sheet 170 made of an inelastic insulating material enable the conductive part 115 of the rubber socket 100 to be stably connected to the pad 23 of the tester 20.

The connection sheet 130 and the guide sheet 170 made of such an inelastic insulating material may be made of polyimide film, engineering plastic, synthetic resin, or various other inelastic insulating materials.

As illustrated in FIGS. 3A-3G, the component 150 and the guide sheet 170 may be coupled to the connection sheet 130 in the following method.

As illustrated in FIG. 3A, a sheet 50 made of an inelastic insulating material is prepared, and connection holes 131 are formed to penetrate at each position corresponding to the conductive part 115.

Thereafter, as illustrated in FIG. 3B, bridge holes 132 extending toward each other are formed in a pair of connection holes 131 formed at positions corresponding to the communication conductive part 112. The bridge holes 132 are not connected to each other, and a sheet of an inelastic insulating material is left between the bridge holes 132 to function to insulate the connectors 140 to be formed later.

Thereafter, as illustrated in FIG. 3C, the connector 140 is formed in the connection hole 131 and the bridge hole 132. The connector 140 may be formed in various shapes, as illustrated in FIG. 4 in consideration of a size of the component 150, a connection area with the component 150, and the like.

Thereafter, as illustrated in FIG. 3D, by filling the conductive particle mixture in the connection hole 131 formed at a position corresponding to the electrode conductive part 111 and the remaining portion of the connection hole 131 in which the connector 140 is disposed, when a connector 140 in contact with the connection conductive part 135 and the conductive particle mixture is provided, the connection sheet 130 is completed.

Thereafter, as illustrated in FIG. 3E, the component 150 is mounted on the upper surface of the pair of connectors 140 of the completed connection sheet 130. An input terminal and output terminal of the component 150 may be disposed to be respectively connected to a pair of connectors 140.

Thereafter, as illustrated in FIG. 3F, the guide sheet 170 in which guide holes 171 and 172 are penetrated is attached to the upper surface of the connection sheet 130 on which the component 150 is mounted. The guide holes 171 and 172 of the guide sheet 170 are formed at each position corresponding to the connection conductive part 135 and the component 150. The guide hole 172 formed at a position corresponding to the component 150 is formed larger than the component 150 so as to receive the component 150 and is formed larger than the guide hole 171 formed at a position corresponding to the connection conductive part 135.

FIG. 3G is a perspective view illustrating the component 150 and the guide sheet 170 coupled to the connection sheet 130 formed in the same method as that described above.

A test device 1000 using the rubber socket 100 according to an embodiment of the disclosure operates in the following manner when testing the device to be tested 10.

As illustrated in FIGS. 5A-5B, when the rubber socket 100 is mounted on the tester 20 and the device to be tested 10 is pressed downward by a pressing means such as a pusher (not illustrated), the terminal 13 of the device to be tested compresses the connection conductive part 135, and the lower end of the electrode conductive part 111 coupled to the connection conductive part 135 is compressed to the electrode pad 21 of the tester 20 to form an electrical path. In this case, a test signal of the device to be tested 10 generated in the tester 20 is transmitted to the device to be tested 10 through the rubber socket 100; thus, an electrical test on the device to be tested 10 may be performed.

Simultaneously with a test of the device to be tested 10 as described above, characteristics of the tester 20 may be tested. When the device to be tested 10 presses the rubber socket 100, the lower end of the communication conductive part 112 also compresses the communication pad 22 of the tester 20. In this case, an electrical path is formed between the communication pad 22 of the tester 20, the communication conductive part 112, the connector 140, and the component 150; thus, as indicated by the arrow in FIG. 5B, a signal transmitted from one communication pad 22 is transmitted to the component 150 through the communication conductive part 112 and the connector 140, and the component 150 transmits the received signal to the other communication pad 22 through the connector 140 and the communication conductive part 112. Accordingly, the tester 20 may test characteristics thereof, such as whether the tester 20 operates normally by communicating with the component 150 by a method of receiving a signal transmitted to the component 150.

The rubber socket 100 according to an embodiment of the disclosure may include a plurality of built-in components 150. By providing a plurality of a pair of communication pads 22 connected to a pair of communication conductive parts 112 in the tester 20, and forming a pair of connectors 140 connected to each component 150 and a pair of communication conductive parts 112 connected to the pair of connectors 140 in the rubber socket 100, various functions of the tester may be tested with the rubber socket 100 having a plurality of built-in components 150.

Figure 6A:
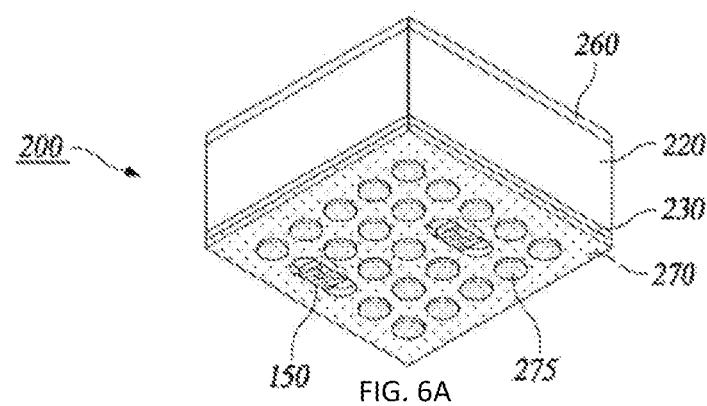
FIGS. 6A-6B illustrate a rubber socket with a component mounted on the lower side according to another embodiment of the disclosure.
Figure 6B:
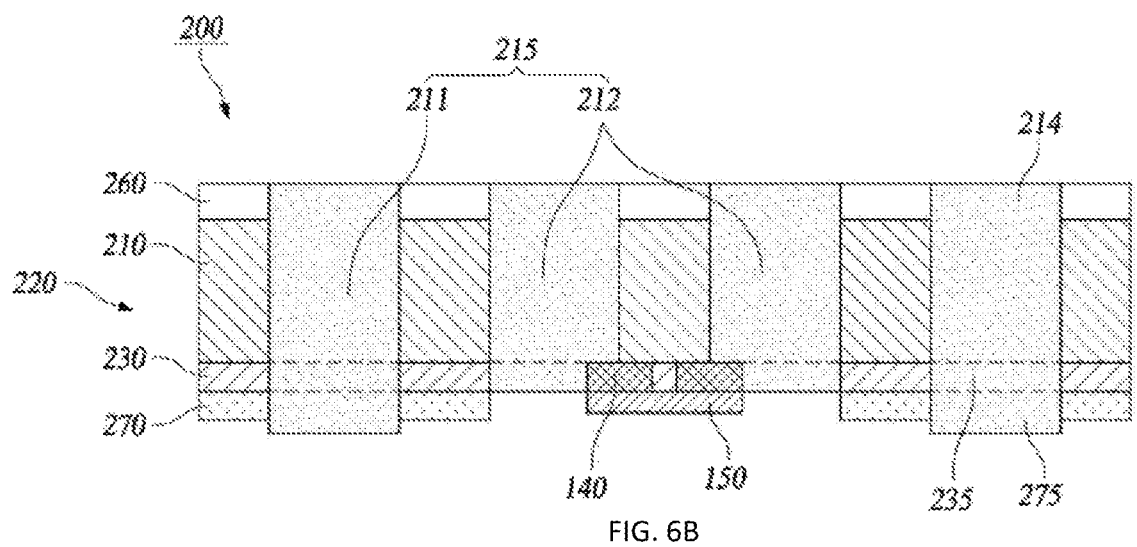
Figure 7A:
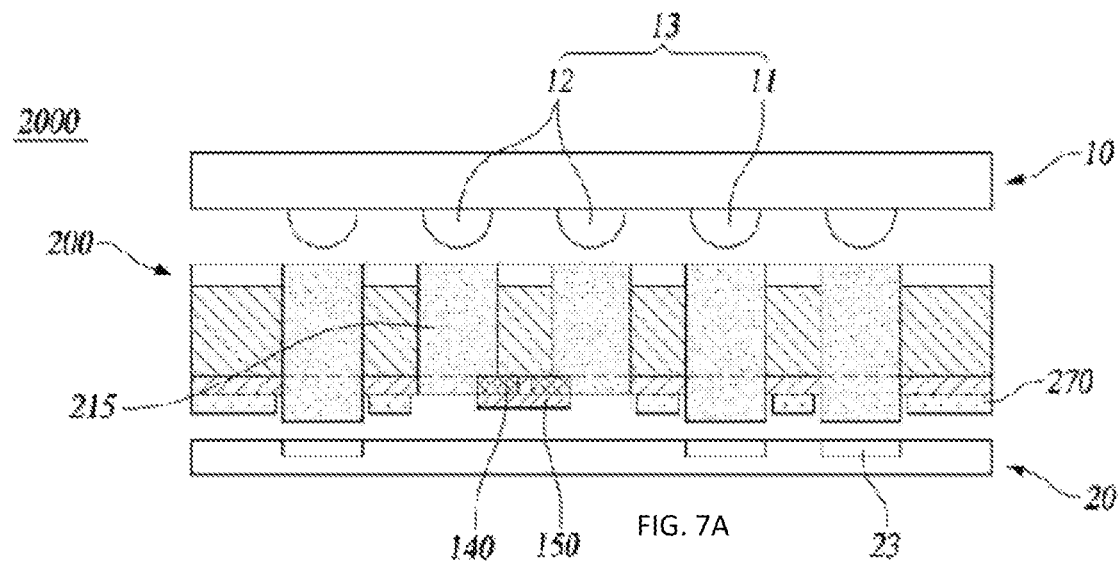
FIGS. 7A-7B illustrate an operation of a rubber socket according to another embodiment of the disclosure.
Figure 7B:
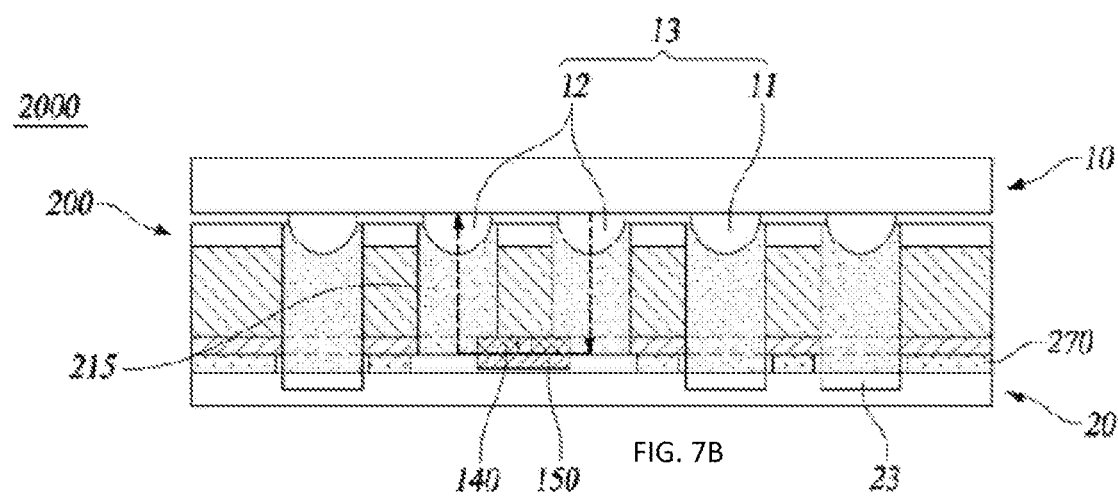

FIGS. 6A-6B illustrate a rubber socket with components mounted at the lower side according to another embodiment of the disclosure, and FIGS. 7A-7B illustrate an operation of a rubber socket according to another embodiment of the disclosure.

In a rubber socket 200 according to another embodiment of the disclosure, a connection sheet 230 to which a component 150 is attached is separately coupled to a lower surface of a conductive sheet 220 compared to the rubber socket 100 according to an embodiment of the disclosure.

The rubber socket 200 with a built-in component according to another embodiment of the disclosure connects a device to be tested 10 to a tester 20 for generating a test signal to perform an electrical test on the device to be tested 10, wherein the device to be tested 10 includes a terminal 13 of the device to be tested 10 including electrode terminals 11 each electrically connected to a plurality of pads 23 of the tester, and a pair of communication terminals 12 at adjacent positions, wherein the rubber socket 200 includes a conductive part 215 formed in a form in which a plurality of conductive particles are included in an elastic insulating material and including an electrode conductive part 211 disposed at a position corresponding to the electrode terminal and a pair of communication conductive parts 212 disposed at a position corresponding to a communication terminal, and a conductive sheet 220 including an insulating part 210 for insulating adjacent conductive parts while supporting the conductive part, a connection sheet 230 of an insulating material detachably coupled to a lower surface side of the conductive sheet and in which connection holes are formed at each position corresponding to the conductive part and in which a connection conductive part 235 is disposed in the connection hole corresponding to the electrode conductive part and in which a pair of connectors 140 are disposed in the connection hole corresponding to the communication conductive part, a component 150 disposed at a lower surface of a pair of connectors of the connection sheet, a guide sheet 270 of an insulating material attached at a lower surface side of the connection sheet and in which guide holes are formed at each position corresponding to the connection conductive parts and components, and a conductive part lower bump 275 formed in the guide holes of positions corresponding to the connection conductive parts of the guide sheet, wherein characteristics of the device to be tested may be tested through components.

In the case that the connection sheet 230 to which the component 150 is attached is detachably coupled to a lower surface side of the conductive sheet 220, it is preferable to form a conductive part lower bump 275 in a guide hole formed at a position corresponding to the connection conductive part 235 in the guide sheet 270. In this case, it is better to form the conductive part lower bump 275 to protrude downward from the guide sheet 270. The conductive part 215 may be more stably connected to the pad 23 of the tester by the conductive part lower bump 275.

Further, in the case that the connection sheet 230 to which the component 150 is attached is detachably coupled to a lower surface side of the conductive sheet 220, a conductive part upper bump 214 connected to the conductive part 215 and protruding toward the upper side of the insulating part 210 may be formed. The conductive part upper bump 214 may be supported by an upper insulating sheet 260. The conductive part upper bump 214 and the upper insulating sheet 260 may not be formed.

The conductive sheet 220 is substantially the same as the conductive sheet 120 in the rubber socket according to an embodiment of the disclosure, and the guide sheet 270 is formed to be substantially the same as the guide sheet 170 in the rubber socket according to an embodiment of the disclosure except that the guide sheet 270 is attached to the lower side of the connection sheet.

As illustrated in FIGS. 7A-7B, a test device 2000 using a rubber socket 300 according to another embodiment of the disclosure may test characteristics of the device to be tested 10 simultaneously with a test of the device to be tested 10 by the tester 20. When the device to be tested 10 presses the rubber socket 300, the communication terminal 12 of the device to be tested 10 presses the upper end of the communication conductive part 212. In this case, because an electrical path is formed between the communication terminal 12 of the device to be tested 10, the communication conductive part 212, the connector 140, and the component 150, as indicated by the arrow of FIG. 7B, a signal transmitted from one communication terminal 12 is transmitted to the component 150 through the communication conductive part 212 and the connector 140, and the component 150 transmits the received signal to the other communication terminal 12 through the connector 140 and the communication conductive part 212. Therefore, the device to be tested 10 may communicate with the component 150 by a method of receiving a signal transmitted to the component 150 to test characteristics of the device to be tested 10 such as measuring a speed between terminals of the device to be tested 10.

FIG. 8 illustrates a rubber socket according to another embodiment of the disclosure.

As exemplarily illustrated in FIG. 8, in a rubber socket 300 according to another embodiment of the disclosure, the connection sheets 130 and 230 to which the component 150 is attached are detachably coupled to both upper surface and lower surface sides of the conductive sheet compared to the rubber socket 100 according to an embodiment of the disclosure and the rubber socket 200 according to another embodiment of the disclosure. When the rubber socket 300 according to another embodiment of the disclosure is used, characteristics of the tester 20 and the device to be tested 10 may be tested simultaneously. In FIG. 8, reference numeral 310 indicates an insulating part and reference numeral 315 indicates a conductive part.

Rubber sockets with such a built-in component have the following advantages.

First, because the rubber sockets 100, 200, and 300 according to an embodiment of the disclosure have built-in components, there is no need to separately mount components in the tester or the device to be tested; thus, a size of the tester or the device to be tested can be reduced.

Further, because the rubber sockets 100, 200, and 300 according to embodiments of the disclosure have built-in components, interference between the tester and the rubber socket, and the device to be tested and the rubber socket caused by the components may be avoided; thus, electrical signal transmission characteristics can be improved by shortening a signal path.

Further, in the rubber sockets 100, 200, and 300 according to embodiments of the disclosure, because the connection sheet to which the component is attached is detachably coupled to the conductive sheet, when either the conductive sheet or the connection sheet is damaged, only a necessary part can be easily replaced, thereby having the effect of reducing a cost and improving work productivity.

Although the disclosure has been illustrated and described in connection with preferred embodiments for illustrating the principles thereof, the disclosure is not limited to the constitution and operation as illustrated and described. Rather, those skilled in the art will understand that numerous changes and modifications may be made to the disclosure without departing from the spirit and scope of the appended claims.

Because a rubber socket with a built-in component according to the disclosure has a built-in component, there is no need to separately mount a component on a tester or a device to be tested, thereby reducing a size of the tester or the device to be tested.

Further, because the rubber socket according to the disclosure has a built-in component, interference between a tester and a rubber socket, a device to be tested and a rubber socket caused by the component can be avoided; thus, a signal path can be shortened to improve electrical signal transmission characteristics.

Further, in the rubber socket according to the disclosure, because a connection sheet to which the component is attached is detachably coupled to the conductive sheet, when either the conductive sheet or the connection sheet is damaged, only necessary parts can be easily replaced; thus, a cost can be reduced and work productivity can be improved.

| Explanation of Reference Numerals | |
|---|---|
| 10: device to be tested | 11: electrode terminal |
| 12: communication terminal | 13: terminal of device to be tested |
| 20: tester | 21: electrode pad |
| 22: communication pad | 23: tester pad |
| 100, 200, 300: rubber socket | 110, 210, 310: insulating part |
| 111, 211: electrode conductive part | |
| 112, 212: communication conductive part | |
| 113, 275: conductive part lower bump | |
| 115, 215, 315: conductive part | |
| 120, 220: conductive sheet | 130, 230: connection sheet |
| 135, 235: connection conductive part | |
| 140: connector | |
| 150: component | 160: lower insulation sheet |
| 170, 270: guide sheet | 260: upper insulating sheet |
| 1000, 2000: test device | |

What is claimed is:

1. A rubber socket for connecting a device to be tested to a tester for generating a test signal to perform an electrical test on the device to be tested, wherein the tester comprises a tester pad including electrode pads each electrically connected to a plurality of terminals of the device to be tested, and a pair of communication pads at adjacent positions,
wherein the rubber socket comprises:
a conductive sheet comprising a conductive part formed in a form in which a plurality of conductive particles are included in an elastic insulating material and comprising an electrode conductive part disposed at a position corresponding to the electrode pad and a pair of communication conductive parts disposed at a position corresponding to the communication pad, and an insulating part configured to insulate adjacent conductive parts while supporting the conductive part;
a connection sheet made of an insulating material detachably coupled to an upper surface side of the conductive sheet, having connection holes formed at each position corresponding to the conductive part, and in which a connection conductive part is disposed in the connection hole corresponding to the electrode conductive part, and in which a pair of connectors are disposed in the connection hole corresponding to the communication conductive part;
a component disposed at an upper surface of the pair of connectors of the connection sheet; and
a guide sheet made of an insulating material attached to an upper surface side of the connection sheet and having guide holes formed at each position corresponding to the connection conductive part and the component,
wherein characteristics of the tester are tested through the component.

2. The rubber socket of claim 1, wherein the component is a resistor, an inductor, a capacitor, or an electromagnetic device in which the resistor, the inductor, and the capacitor are coupled.

3. The rubber socket of claim 1, wherein the connection sheet further comprises a bridge hole extended from the connection hole corresponding to the communication conductive part, and
the connector is formed in any one of a form that fills both the connection hole and the bridge hole, a form that fills a portion of the connection hole and the bridge hole, or a form that fills only the bridge hole.

4. The rubber socket of claim 1, wherein a thickness of the guide sheet is greater than that of the component.

5. The rubber socket of claim 1, wherein the connection sheet and the guide sheet are made of any one of polyimide film, engineering plastic, or synthetic resin which are inelastic insulating materials.

6. The rubber socket of claim 1, wherein the conductive part further comprises a conductive part lower bump protruding downward from the insulating part.

7. The rubber socket of claim 6, wherein a lower insulating sheet configured to support the conductive part lower bump is attached to a lower surface of the insulating part.

8. A rubber socket for connecting a device to be tested to a tester for generating a test signal to perform an electrical test on the device to be tested, wherein the device to be tested comprises terminals of the device to be tested including electrode terminals each electrically connected to a plurality of pads of the tester, and a pair of communication terminals at adjacent positions, wherein the rubber socket comprises:
a conductive sheet comprising a conductive part formed in a form in which a plurality of conductive particles are included in an elastic insulating material and comprising an electrode conductive part disposed at a position corresponding to the electrode terminal and a pair of communication conductive parts disposed at a position corresponding to the communication terminal, and an insulating part configured to insulate adjacent conductive parts while supporting the conductive part;
a connection sheet made of an insulating material detachably coupled to a lower surface side of the conductive sheet, having connection holes formed at each position corresponding to the conductive part and in which a connection conductive part is disposed in the connection hole corresponding to the electrode conductive part, and in which a pair of connectors are disposed in the connection hole corresponding to the communication conductive part;
a component disposed at a lower surface of the pair of connectors of the connection sheet;
a guide sheet made of an insulating material attached to a lower surface side of the connection sheet and having guide holes formed at each position corresponding to the connection conductive part and the component; and
a conductive part lower bump formed in the guide hole at a position corresponding to the connection conductive part of the guide sheet,
wherein characteristics of the device to be tested are tested through the component.

* * * * *